United States Patent Office 3,660,353
Patented May 2, 1972

3,660,353
MONOMERS AND POLYMERS OF 10-(ALKENYL) OXYPHENOXARSINES
Chun-Shan Wang and David P. Sheetz, Midland, Mich., assignors to The Dow Chemical Company, Midland, Mich.
No Drawing. Filed Apr. 1, 1970, Ser. No. 24,818
Int. Cl. C07d 105/06; C08f 3/62, 15/02
U.S. Cl. 260—47 UA
16 Claims

ABSTRACT OF THE DISCLOSURE 10-(alkenyloxy)phenoxarsine monomers and certain homopolymers, and interpolymers of certain 10-(alkenyloxy)phenoxarsines with copolymerizable ethylenically unsaturated compounds are disclosed as novel compounds useful as herbicides and as antimicrobial agents for the control of a wide variety of fungal and bacterial organisms.

SUMMARY OF THE INVENTION

This invention is directed to novel 10-(alkenyloxy) phenoxarsine based monomers and to polymers derived therefrom. Such polymers include homopolymers of certain 10-(alkenyloxy)phenoxarsine monomers and interpolymers of such monomers with ethylenically unsaturated compounds copolymerizable therewith.

The monomeric compounds of the present invention are normally white crystalline solids soluble in various organic solvents and of low solubility in water. The homopolymers and interpolymers are solid substances which are slightly soluble in organic solvents and insoluble in water. Both the monomers and polymers are active anti-microbial agents particularly useful as insecticides, fungicides, herbicides and preservatives, and can be used in marine anti-fouling paints.

The 10-(alkenyloxy)phenoxarsine monomers of the present invention are represented by the following structural formula:

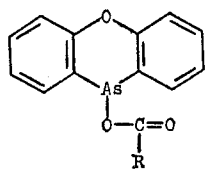

wherein R is

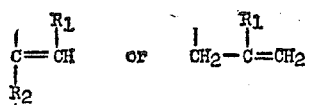

and $R_1$ is hydrogen, methyl, carboxyl, methyl carboxylate, or 10-phenoxarsinyl carboxylate,
and $R_2$ is hydrogen, methyl, chlorine, bromine, fluorine, or iodine.

The monomers are conveniently prepared by reacting 10,10' - oxybisphenoxarsine with alkenyl mono- or dicarboxylic acids or mono-alkyl esters of alkenyl dicarboxylic acids. Representative suitable alkenyl acids include, for example, acrylic, methacrylic, crotonic, 3-butenoic, maleic, fumaric, itaconic, angelic, tigilic, and the like.

The term "alkyl" includes, for example, saturated, monovalent aliphatic radicals, including straight and branched chain radicals of from 1 to about 10 carbon atoms, as illustrated by, but not limited to, methyl, ethyl, propyl, isopropyl, butyl, sec.-butyl, amyl, hexyl, heptyl, octyl, iso-octyl, nonyl, decyl, and the like.

The reaction of the oxybisphenoxarsine reactant and the alkenyl acid reactant conveniently is carried out in the presence of an inert water-immiscible liquid reaction medium. Use of the inert liquid carrier is not critical but it is preferred since it provides for better dispersion and contacting of the reactants. Representative suitable inert liquids include, for example, hydrocarbons of the benzene series such as benzene, toluene and xylene. Preferably, thiophene-free benzene is employed as the inert liquid reaction medium.

The reaction of the oxybisphenoxarsine reactant and the alkenyl acid reactant is carried out at a temperature range of from about 70° to about 100° C. and is preferably conducted at about 80° C. The reaction goes forward under pressures of a wide range; however, no particular advantage ordinarily results from the use of subatmospheric or superatmospheric pressures, and therefore, the preparation is ordinarily carried out at atmospheric pressure.

The amounts of the reactants employed are not critical, some of the monomeric products being formed when the reactants are employed in any proportion. Depending upon the monomeric product desired, the reaction usually consumes the reactants in the proportion of one mole of 10,10'-oxybisphenoxarsine to either one or two moles of the alkenyl acid reactant. A particularly suitable range for the ratio of reactants is from 1:1 to about 1:5 (10,10'-oxybisphenoxarsine:alkenyl acid reactant).

The reaction mixture ordinarily is refluxed in the presence of an inert liquid reaction medium in a refluxing apparatus containing a trap, e.g., a Dean-Stark trap, to azeotrope off the water of formation. Ordinarily, the reactants are refluxed for a period of from about 6 to about 24 hours, and preferably, to obtain optimum yields, from about 10 to about 12 hours. The 10-(alkenyloxy)phenoxarsine product can be recovered from the product mass and the separated product can be employed directly for the useful purposes of the present invention. If desired, the product can be further purified by conventional procedures before being so employed. Representative purification procedures include washing with an appropriate liquid which is a solvent for impurities but not for the product, recrystallization and the like.

The homopolymers of the present invention are prepared by polymerizing either the 10-(acryloyloxy)phenoxarsine or 10-(methacryloyloxy)phenoxarsine monomer.

The polymerization with either monomer is usually carried out at temperatures ranging from about 20° C. to about 100° C. in the presence of a free radical generating organic peroxide initiator. The resulting homopolymer possesses a recurring monomeric unit corresponding to the formula:

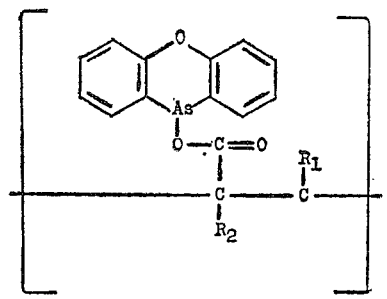

wherein with the acryloyloxy reactant both $R_1$ and $R_2$ are hydrogen and with the methacryloyloxy reactant $R_1$ is hydrogen and $R_2$ is methyl.

Organic peroxide reaction promotors that may be used in the present invention include, for example, lauroyl peroxide, benozyl peroxide, caproylyl peroxide, trystoyl peroxide, phenylacetyl peroxide, acetyl peroxide, dibutyryl peroxide, dilauryl peroxide, succinyl peroxide, methyl ethyl ketone peroxide, cumene hydroperoxide, anisoyl peroxide, furoyl peroxide, perbenzoic acid, peracetic acid, and the like.

The novel interpolymers are conveniently prepared by polymerizing a 10-(alkenyloxy)phenoxarsine monomer of the present invention wherein the alkenyloxy group is acryloyloxy, methacryloyloxy, maleoyloxy, fumaroyloxy, or itaconoyloxy, with an ethylenically unsaturated compound copolymerizable therewith.

Representative ethylenically unsaturated compounds which are copolymerizable with the monomers of the present invention are those compounds possessing a

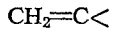

grouping and which contain no groups that will inactivate the phenoxarsine monomer and include, for example:

(1) Monoolefinic hydrocarbons, that is, monomers containing only atoms of hydrogen and carbon, such as styrene, alpha-methyl styrene, alpha-ethyl styrene, alpha-butyl styrene, isobutylene (2-methyl propene-1), 2-methyl-propene-1, 2-methyl-butene-1, 2-methyl-pentene-1, 2,3-dimethyl-butene-1, 2,3-dimethyl-pentene-1, 2,4 - dimethyl-pentene-1, 2,3,3-trimethyl-butene-1, 2-methyl-heptene-1, 2,3-dimethyl-hexene-1, 2,4-dimethyl-hexene-1, 2,5-dimethyl-hexene-1, 2-methyl-3-ethyl-pentene-1, 2,3,3-trimethyl-pentene-1, 2,3,4-trimethyl-pentene-1, 2,4,4-trimethyl-pentene-1, 2-methyl-octene-1, 2,6-dimethyl-heptene-1, 2,6-dimethyl-octene-1, 2,3-dimethyl-decene-1, 2-methyl-nona-decene-1, ethylene, propylene, butylene, amylene, hexylene and the like;

(2) Halogenated monoolefinic hydrocarbons, that is, monomers containing carbon, hydrogen and one or more halogen atoms such as alpha-chlorostyrene, alpha-bromostyrene, 2,5-dichlorostyrene, 2,5-dibromostyrene, 3,4-dichlorostyrene, 3,4-difluorostyrene, ortho-, meta-, and para-fluorostyrenes, 2,6-dichlorostyrene, 2,6-difluorostyrene, 3-fluoro-4-chlorostyrene, 3-chloro-4-fluorostyrene, 2,4,5-trichlorostyrene, dichloromonofluorostyrenes, 2-chloropropene, 2-chlorobutene, 2-chloropentene, 2-chlorohexene, 2-chloroheptene, 2-bromobutene, 2-bromoheptene, 2-fluorohexene, 2-fluorobutene, 2-iodopropene, 2-iodopentene, 4-bromoheptene, 4-chloroheptene, 4-fluoroheptene, cis and trans-1,2-dichloroethylenes, 1,2-dibromoethylene, 1,2-difluoroethylene, 1,2-diiodoethylene, chloroethylene (vinyl chloride), 1,1-dichloroethylene (vinylidene chloride), bromoethylene, fluoroethylene, iodoethylene, 1,1-dibromoethylene, 1,1-difluoroethylene, 1,1-diiodoethylene, 1,1,2,2-tetrafluoroethylene, 1,1,2,2-tetrachloroethylene, 1 - chloro-2,2,2-trifluoroethylene and the like;

(3) Esters or organic and inorganic acids such as vinyl acetate, vinyl propionate, vinyl butyrate, vinyl isobutyrate, vinyl valerate, vinyl caproate, vinyl enanthate, vinyl benzoate, vinyl toluate, vinyl p-chlorobenzoate, vinyl o-chlorobenzoate, vinyl m-chlorobenzoate and similar vinyl halobenzoates, vinyl p-methoxybenzoate, vinyl o-methoxybenzoate, vinyl p-ethoxybenzoate, methyl methacrylate, ethyl methacrylate, propyl methacrylate, butyl methacrylate, amyl methacrylate, hexyl methacrylate, octyl methacrylate, vinyl toluate, vinyl p-chlorobenzoate, vinyl o-chloro- and ethyl tiglate;

Methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate and decyl acrylate;

Isopropenyl acetate, isopropenyl propionate, isopropenyl butyrate, isopropenyl isobutyrate, isopropenyl valerate, isopropenyl caproate, isopropenyl enanthate, isopropenyl benzoate, isopropenyl p-chlorobenzoate, isopropenyl o-chlorobenzoate, isopropenyl o-bromobenzoate, isopropenyl m-chlorobenzoate, isopropenyl toluate, isopropenyl alpha-chloroacetate and isopropenyl alphabromopropionate;

Vinyl alpha-chloroacetate, vinyl alpha-bromoacetate, vinyl alpha-chloropropionate, vinyl alphabromopropionate, vinyl alpha-iodopropionate, vinyl alphachlorobutyrate, vinyl alpha-chlorovalerate and vinyl alpha-bromovalerate;

Allyl chloride, allyl cyanide, allyl bromide, allyl fluoride, allyl iodide, allyl chlorocarbonate, allyl nitrate, allyl thiocyanate, allyl formate, allyl acetate, allyl propionate, allyl butyrate, allyl valerate, allyl caproate, allyl 3,5,5-trimethylhexoate, allyl benzoate, allyl acrylate, allyl crotonate, allyl oleate, allyl chloroacetate, allyl trichoroacetate, allyl chloropropionate, allyl chlorovalerate, allyl lactate, allyl pyruvate, allyl amino acetate, ally acetoacetate, allyl thioacetate, as well as methallyl esters corresponding to the above allyl esters as well as esters from such alkenyl alcohols as beta-ethyl allyl alcohol, beta-propyl allyl alcohol, 1-buten-4-ol, 2-methyl-butenol-4, 2-(2,2-dimethyl-propyl)-1-buten-4-ol and 1-pentene-4-ol;

Methyl alpha-chloroacrylate, methyl alpha-bromoacrylate, methyl alpha-fluoroacrylate, methyl alpha-iodoacrylate, ethyl alpha-chloroacrylate, propyl alpha-chloroacrylate, isopropyl alpha-bromoacrylate, amyl alpha-chloroacrylate, octyl alpha-chloroacrylate, 3,5,5-trimethyl-hexyl alpha-chloroacrylate, decyl alpha-chloroacrylate, methyl alpha-cyano acrylate, ethyl alpha-cyano acrylate, amyl alpha-cyano-acrylate and decyl alpha-cyano acrylate;

Dimethyl maleate, diethyl maleate, diallyl maleate, dimethyl fumarate, diethyl fumarate, dimethallyl fumarate and diethyl glutaconate;

(4) Organic nitriles such as acrylonitrile, methacrylonitrile, ethacrylonitrile, 3-octenenitrile, crotonitrile, oleonitrile, and the like;

(5) Acid monomers such as acrylic acid, methacrylic acid, maleic, fumaric, itaconic, and the like;

(6) Organic amides containing $>C=CH_2$ groups and being represented by acrylamide, methacrylamide, n-tertiary butyl acrylamide, methylene bis-acrylamide, and the like.

The phenoxarsine monomer and copolymerizable moiety are reacted in predetermined proportions calculated to yield a polymer composition comprising from about 0.5 to about 95 weight percent of a 10-(alkenyloxy)phenoxarsine monomer and from about 99.5 to about 5 weight percent of the ethylenically unsaturated moiety copolymerized therewith. Usually, the polymer compositions comprise from about 10 to about 50 weight percent of the phenoxarsine monomer and from about 90 to about 50 weight percent of the ethylenically unsaturated moiety. The polymerization ordinarily occurs at temperatures of from about 20 to about 110° C. and is carried out in the presence of a free radical generating peroxide initiator, such as, for example, one of those set forth hereinbefore.

The polymers can also be prepared in admixture with a solvent or an organic liquid such as xylene, toluene, benzene, ethylbenzene, methylethylketone, acetone, carbon tetrachloride and the like, or mixtures of such solvents.

The following examples serve to illustrate the present invention and the manner by which it can be practiced but as such should not be construed as limitations upon the overall scope of the same.

EXAMPLE 1

10-(acryloyloxy)phenoxarsine 10,10'-oxybisphenoxarsine (50.2 grams; 0.1 mole) and acrylic acid (16.0 grams; 0.21 mole) are mixed together in 500 milliliters of thiophene-free benzene at room temperature to prepare a reaction mixture. The reaction mixture is refluxed from about sixteen to about twenty hours in a round-bottom flask equipped with a reflux condenser and Dean-Stark trap to azeotrope off the water of formation. One (1.0) gram of activated adsorption carbon is added to decolorize the resulting light brown solution. The solution is filtered and the resulting light yellow filtrate is dried on a rotary evaporator, yielding a white solid. This solid is further dried overnight in a desiccator under reduced pressure, and 58.5 grams (93.4 percent of theoretical) of the desired 10-(acryloyloxy)phenoxarsine product is obtained as a white crystalline solid melting at from 143°–147° C. Mass and infrared spectral analyses are consistent with the proposed structure of the product.

EXAMPLE 2

10-(methacryloyloxy)phenoxarsine

By following the procedural steps of Example 1, 10-(methacryloyloxy)phenoxarsine is obtained by reacting together 10,10'-oxybisphenoxarsine and methacrylic acid. The desired product is obtained as a white crystalline solid in a yield of 92 percent of theoretical by drying the filtered reaction solution under reduced pressure. The monomer has a melting point of from 81° to 85° C. and its infrared and mass spectra support the proposed structure.

In similar procedures, the following representative monomers are prepared.

10,10'-oxybisphenoxarsine is reacted with maleic acid in a 1:1 molar ratio, to provide 10,10'-(maleoyl dioxy)diphenoxarsine, melting at 210° to 211° C.

10,10'-oxybisphenoxarsine is reacted with maleic acid in a 1:2 molar ratio, to provide 10-(hydrogen maleoyloxy) phenoxarsine, melting at 192° C.

10,10'-oxybisphenoxarsine is reacted with fumaric acid in a 1:1 molar ratio, to provide trans-10,10'-(fumaroyl dioxy)diphenoxarsine, melting at 232° to 233° C.

10,10'-oxybisphenoxarsine is reated with itaconic acid in a 1:1 molar ratio to provide 10,10'-((methylenesuccinyl)dioxy)diphenoxarsine, melting at 194° to 195° C.

10,10'-oxybisphenoxarsine is reacted with 2-chloropropenoic acid in a 1:2 molar ratio to provide 10-(2-chloroacryloyloxy)phenoxarsine having a molecular weight of 348.61.

EXAMPLE 3

Homopolymer of 10-(acyloyloxy)phenoxarsine 10-acryloyloxy)phenoxarsine (9.43 grams; 0.03 mole) is admixed with 100 milliliters of benzene or toluene and placed into a flask. The flask is maintained under agitation and purged with nitrogen. Thereafter, 0.20 gram of benzoyl peroxide is added. The flask is again purged with nitrogen and the contents of the flask are maintained at from about 80° to about 90° C. for about six hours with constant agitation. The reaction mixture is cooled to room temperature, the solution filtered and the residual solid is dried in a desiccator. The desired polymeric product is obtained in a yield of 8 grams (84.8 percent of theoretical) and has a softening point of 120° C. The 10-acryloyloxy)phenoxarine homopolymer has an average molecular weight of 620.

EXAMPLE 4

Homopolymer of 10-(methacryloyloxy)phenoxarsine

By following the procedural steps of Example 3, a homopolymer of 10-(mehacryloyloxy)phenoxarsine is prepared. The 10-(methacryloyloxy)phenoxarsine polymer has a softening point of 195° C. and an average molecular weight of 673.

In a similar procedure, the following representative homopolymer is prepared:

10-(hydrogen maleoyloxy)phenoxarsine is reacted with benzoyl peroxide to provide the polymer of 10-(hydrogen maleoyloxy)phenoxarsine with an average molecular weight of 714.

EXAMPLE 5

Interpolymer of 10-(methacryloyloxy)phenoxarsine with acrylic acid 10-(methacryloyloxy)phenoxarsine (3.28 grams; 0.01 mole) and acrylic acid (2.16 grams; 0.001 mole) are admixed with 100 milliliters of toluene and placed into a reaction flask. The reaction solution is purged with nitrogen after which 0.24 gram (0.001 mole) of benzoyl peroxide initiator is added to the solution. The reactants are again purged with nitrogen and the flask is maintained under agitation at a temperature of 100° C. for five hours, during which time white solids precipitate from the solution. The reaction mixture is allowed to stand at room temperature overnight after which the contents of the flask are removed by suction filtration; the white, solid residue remaining on the filtered is dried in a desiccator under reduced pressure. The filtrate is dried on a rotary evaporator and another crop of polymer is obtained and combined with the solid product initially recovered to give a total yield of 5 grams (91.9 percent of theoretical) of the desired copolymer. The copolymer of 10-(methacryloyloxy)phenoxarsine and acrylic acid has an average molecular weight of 1860 and a softening point of 180° C.

Following the same general procedure as described in Example 5, the following representative interpolymers are prepared:

| Interpolymer of: | Softening point, ° C. |
|---|---|
| 10-(methacryloyloxy)phenoxarsine and styrene | 130 |
| 10-(acryloyloxy)phenoxarsine and styrene | 135 |
| 10-(acryloyloxy)phenoxarsine and methacrylic acid | 225 |

The polymeric products of the invention are fairly soluble in polar solvents such as chloroform, ethanol, tetrahydrofuran, cyclohexanone and the like. In addition, they are thermoplastic, moldable under heat and pressure and are film forming when sprayed.

The products of the present invention are useful as pesticides for the control of a wide variety of fungal and bacterial organisms such as *Pullularia pullulans, Candida pelliculosa, Aspergillus terreus, Rhizopus nigricans, Aerobacter aerogenes, Bacillus subtilis, Pseudomonas aeruginosa, Pseudomonas* species strain 10, *Salmonella typhosa* and *Staphylococcus aureus*. They are also found to exhibit outstanding pre- and post-emergent herbicidal activity on terrestrial plants. For any of these uses, the unmodified compounds can be employed. Alternatively, the compounds can be dispersed on an inert finely divided solid to prepare dust compositions. The latter duct compositions can be dispersed in water with or without the aid of a wetting agent and the resulting aqueous dispersions employed as sprays. In other procedures, the compounds can be employed as a constituent in edible oils or in other oils or solvents, or as a constituent in solvent-water or water-in-solvent emulsions or dispersions which can be employed as sprays, drenches or washes. Good results are obtained with methods employing and compositions containing pesticidal amounts of one or more of the compounds hereof. Generally, these amounts range from about 1 to about 500 parts per million of one or more of the compounds.

In representative operations, each of 10-(acryloyloxy) phenoxarsine, 10-(methacryloyloxy)phenoxarsine, homopolymers of 10-(acryloyloxy)phenoxarsine and 10-(methacryloyloxy)phenoxarsine and copolymers of 10-(methacryloyloxy)phenoxarsine with acrylic acid and 10-(acryloyloxy)phenoxarsine with methacrylic acid gives complete control and kill of the organisms enumerated above as well as the following additional bacteria and fungi: *Escherichia coli, Candida albicans, Trichophyton mentagrophytes* and *Mycobacterium phlei* when one of the named compounds is separately applied, as the sole toxicant, to the environments containing and supporting thriving members of one of such organisms at a concentration of 100 parts per million by weight.

In further representative operations, each of the copolymers 10-(acryloyloxy)phenoxarsine with styrene and 10-(methacryloyloxy)phenoxarsine with styrene gives substantially complete control and kill of pigweeds, wild mustard-charlock, bindweeds, yellow foxtail and crabgrass when aqueous dispersions containing the named compounds, as the sole toxicant, in amounts which provide rates of 20 pounds per acre are used in pre-emergence soil treatment. Post-emergence herbicidal actvity against the same plants is obtained with the same compounds when the plants are sprayed to run-off with an aqueous dispersion containing one of the named compounds, as the sole toxicant, at a concentration of 4000 parts per million by weight.

In additional operations, the 10-(acryloyloxy)phenoxarsine and 10-(methacryloyloxy)phenoxarsine monomers give complete control and kill of yellow fever mosquito larva when such are contacted with aqueous compositions containing the named compounds, as the sole toxicant, at a concentration of one part per million by weight. The compounds exhibit residual efficacy as evidenced by complete control and kill of the larva with seven days intervening between initial treatment of the water and larval infestation.

The basic starting materials used in preparing the monomers of the invention, i.e., 10,10'-oxybisphenoxarsine and mono- or di-carboxylic alkenyl acids, e.gg., acrylic and methacrylic acid, are readily available known compounds; additionally, these can be prepared in accordance with known methods as reported in the open literature.

We claim:
1. Compounds corresponding to the formula:

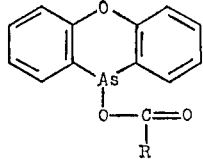

wherein R is

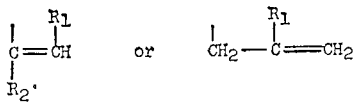

and $R_1$ is hydrogen, methyl, carboxyl, methyl carboxylate, or 10-phenoxarsinyl carboxylate,
and $R_2$ is hydrogen, methyl, chlorine, bromine, fluorine, or iodine.
2. The compound of claim 1 which is 10-(methacryloyloxy)phenoxarsine.
3. The compound of claim 1 which is 10-(acryloyloxy)phenoxarsine.
4. The compound of claim 1 which is 10,10'-(maleoyldioxy)diphenoxarsine.
5. The compound of claim 1 which is 10-(hydrogen maleoyloxy)phenoxarsine.
6. The compound of claim 1 which is trans-10,10'-(fumaroyl dioxy)diphenoxarsine.
7. The compound of claim 1 which is 10,10'-((methylenesuccinyl)dioxy)diphenoxarsine.
8. A solid, thermoplastic homopolymer of a 10-(alkenyloxy)phenoxarsine monomer having the formula:

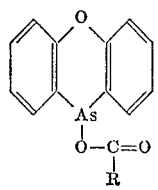

wherein R is

comprising a recurring 10-(alkenyloxy)phenoxarsine unit corresponding to the formula:

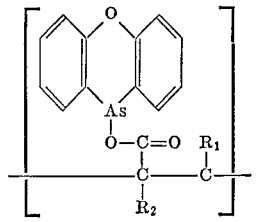

wherein, in the above formulas, $R_1$ is hydrogen and $R_2$ is hydrogen or methyl.
9. The polymer claimed in claim 8 wherein the recurring 10-(alkenyloxy)phenoxarsine monomeric unit is 10-(acryloyloxy)phenoxarsine.
10. The polymer claimed in claim 8 wherein the recurring 10-(alkenyloxy)phenoxarsine monomeric unit is 10-(methacryloyloxy)phenoxarsine.
11. A solid, thermoplastic polymer composition which comprises a copolymer containing at least from about 0.5 to about 95 weight percent of a 10-(alkenyloxy)phenoxarsine compound corresponding to the formula:

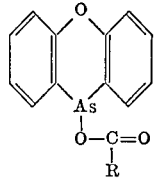

wherein R is

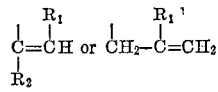

$R_1$ is hydrogen, carboxyl, or 10-phenoxarsinyl carboxylate, and $R_2$ is hydrogen or methyl and from about 99.5 to about 5 weight percent of an ethylenically unsaturated compound copolymerizable therewith.
12. The composition claimed in claim 11 wherein the copolymer contains from about 5.0 to about 95 weight percent of said 10-(alkenyloxy)phenoxarsine compound and from about 95.0 to about 5.0 weight percent of said ethylenically unsaturated compound copolymerizable therewith.
13. The composition claimed in claim 11 wherein the copolymer contains about 10 weight percent 10-(acryloyloxy)phenoxarsine and about 90 weight percent of methacrylic acid.
14. The composition claimed in claim 11 wherein the copolymer contains about 5 weight percent 10-(methacryloyloxy)phenoxarsine and about 95 weight percent of acrylic acid.
15. The composition claimed in claim 11 wherein the copolymer contains about 10 weight percent 10-(acryloyloxy)phenoxarsine and about 90 weight percent of styrene.
16. The composition claimed in claim 11 wherein the copolymer contains about 50 weight percent 10-(methacryloyloxy)phenoxarsine and about 50 weight percent of styrene.

References Cited
UNITED STATES PATENTS 3,481,958   12/1969   Pellegrini et al. _____ 260—404

JOSEPH L. SCHOFER, Primary Examiner
S. M. LEVIN, Assistant Examiner

U.S. Cl. X.R.
260—62, 440; 424—297

UNITED STATES PATENT OFFICE
CERTIFICATE OF CORRECTION

Patent No. 3,660,353           Dated    2 May 1972

Inventor(s) Chun-Shan Wang and David P. Sheetz

It is certified that error appears in the above-identified patent and that said Letters Patent are hereby corrected as shown below:

Column 3, line 61, delete "vinyl toluate, vinyl p-chlorobenzoate, vinyl o-chloro-" and insert --decyl methacrylate, methyl crotonate, ethyl crotonate--

Column 4, line 13, delete "ally" and insert --allyl--.

Column 5, line 44, change "(acyloyloxy)" to --(acryloyloxy)--.

line 66, change "(mehacryloyloxy)" to --(methacryloyloxy)--.

Column 6, line 16, change "filtered" to --filter--.

Column 7, line 29, change "e.gg.," to --e.g.,--.

Signed and sealed this 10th day of October 1972

(SEAL)
Attest:

EDWARD M. FLETCHER, JR.           ROBERT GOTTSCHALK
Attesting Officer                 Commissioner of Patents